US012809745B1

(12) United States Patent
Wei et al.

(10) Patent No.: US 12,809,745 B1
(45) Date of Patent: Nov. 24, 2026

(54) CODE MODELS WITH STATIC ANALYSIS

(71) Applicant: AUGMENT COMPUTING, INC., Palo Alto, CA (US)

(72) Inventors: Jiayi Wei, Mountain View, CA (US); Arun Tejasvi Chaganty, Los Altos, CA (US); Guy Gur-Ari Krakover, Palo Alto, CA (US); Michiel Steven De Jong, Palo Alto, CA (US); Igor Ostrovsky, Mountain View, CA (US); Yuzhe Zhao, San Francisco, CA (US)

(73) Assignee: AUGMENT COMPUTING, INC., Palo Alto, CA (US)

( * ) Notice: Subject to any disclaimer, the term of this patent is extended or adjusted under 35 U.S.C. 154(b) by 226 days.

(21) Appl. No.: 18/407,635

(22) Filed: Jan. 9, 2024

Related U.S. Application Data

(60) Provisional application No. 63/587,251, filed on Oct. 2, 2023.

(51) Int. Cl.
*G06F 11/3604* (2025.01)

(52) U.S. Cl.
CPC ................................ *G06F 11/3608* (2013.01)

(58) Field of Classification Search
CPC ........... G06F 11/3604; G06F 8/75; G06F 8/30
See application file for complete search history.

(56) References Cited

U.S. PATENT DOCUMENTS

| | | | | |
|---|---|---|---|---|
| 9,208,056 | B1 * | 12/2015 | Henriksen | G06F 11/3604 |
| 9,891,894 | B1 * | 2/2018 | Englehart | G06F 8/35 |
| 9,928,040 | B2 * | 3/2018 | Tarlow | G06F 11/3604 |
| 10,628,130 | B2 * | 4/2020 | Fu | G06N 20/00 |
| 11,461,081 | B2 * | 10/2022 | Zhang | G06N 3/0442 |
| 11,494,285 | B1 * | 11/2022 | Manthey | G06F 11/3604 |
| 11,604,628 | B2 * | 3/2023 | Ni | G06N 3/045 |
| 11,693,637 | B1 * | 7/2023 | Singh | G06F 8/436 717/139 |
| 11,972,232 | B2 * | 4/2024 | Clement | G06N 3/09 |
| 12,175,220 | B2 * | 12/2024 | Sundaresan | G06F 8/427 |
| 12,314,154 | B2 * | 5/2025 | Duan | G06N 20/00 |

(Continued)

FOREIGN PATENT DOCUMENTS

| | | | | | |
|---|---|---|---|---|---|
| CN | 109614103 | A | * | 4/2019 | G06F 8/447 |
| CN | 113126973 | A | * | 7/2021 | G06N 3/045 |
| CN | 114741066 | A | * | 7/2022 | G06F 8/30 |

OTHER PUBLICATIONS

Li, Jian, et al. "Code completion with neural attention and pointer networks." arXiv preprint arXiv:1711.09573 (2017).*

(Continued)

*Primary Examiner* — Francisco J Aponte

(57) ABSTRACT

Methods, systems, products, services, and apparatuses for improving code models with static analysis, including: performing static analysis on computer program code in a domain-specific codebase; determining that an existing segment of code in the domain-specific codebase may be a candidate for inclusion the generated computer program code; receiving, based on results from performing static analysis, information describing the existing code segment; and generating, based at least in part on results from performing static analysis, computer program code, wherein the computer program code is also generated based on information describing the domain-specific codebase.

20 Claims, 9 Drawing Sheets

(56) References Cited

U.S. PATENT DOCUMENTS

| | | | | |
|---|---|---|---|---|
| 12,360,745 | B2 * | 7/2025 | Zhao | G06N 20/00 |
| 2019/0079741 | A1 * | 3/2019 | Makkar | G06F 8/33 |
| 2020/0192662 | A1 * | 6/2020 | Hu | G06F 8/76 |
| 2020/0348929 | A1 * | 11/2020 | Sousa | G06F 8/36 |
| 2020/0371756 | A1 * | 11/2020 | Oburu | G06F 8/20 |
| 2021/0279042 | A1 * | 9/2021 | Allamanis | G06F 8/33 |
| 2021/0357193 | A9 * | 11/2021 | Fu | G06F 18/295 |
| 2022/0147321 | A1 * | 5/2022 | Svyatkovskiy | G06N 7/01 |
| 2023/0138806 | A1 * | 5/2023 | Mamo | G06F 11/3075 714/25 |
| 2023/0185913 | A1 * | 6/2023 | Kutt | G06F 18/24 |
| 2023/0376840 | A1 * | 11/2023 | Le | G06F 18/217 |
| 2023/0418565 | A1 * | 12/2023 | Arumugam Selvaraj | G06F 8/33 |
| 2024/0020116 | A1 * | 1/2024 | Chen | G06N 3/08 |
| 2024/0069873 | A1 * | 2/2024 | Dolby | G06F 8/35 |
| 2024/0069907 | A1 * | 2/2024 | Groenewegen | G06F 8/71 |
| 2024/0281218 | A1 * | 8/2024 | Masad | G06F 8/33 |
| 2024/0319993 | A1 * | 9/2024 | Penrose | G06F 8/72 |
| 2024/0354077 | A1 * | 10/2024 | Wang | G06F 8/42 |

OTHER PUBLICATIONS

Ross, Steven I., et al. "The programmer's assistant: Conversational interaction with a large language model for software development." Proceedings of the 28th international conference on intelligent user interfaces. 2023.*

Boddupally, Hema Latha. "LLM-Enabled Developer Copilots: Integrating Compiler-Level Semantics and Language Models for Intelligent Code Understanding in. NET Systems." (2023).*

Wang, Yue, et al. "Codet5+: Open code large language models for code understanding and generation." Proceedings of the 2023 conference on empirical methods in natural language processing. 2023.*

* cited by examiner

CODE MODELS WITH STATIC ANALYSIS

CROSS REFERENCE TO RELATED APPLICATION

This is a non-provisional application for patent entitled to a filing date and claiming the benefit of earlier-filed U.S. Provisional Patent Application No. 63/587,251, filed Oct. 2, 2023, herein incorporated by reference in its entirety.

DETAILED DESCRIPTION

The present disclosure relates to methods, products, apparatuses, and services for improving code models with static analysis, that may be achieved at least in part using generative AI. Generative AI is a category of artificial intelligence that focuses on creating and generating new data, content, or information. Systems, software, and services that leverage generative AI (hereafter referred to as 'generative AI systems') may be able to produce outputs that resemble human-generated content, such as text, audio, and more, often enabled through the usage of deep learning techniques and neural networks. In one particular embodiment, generative AI systems may be able to produce computer program code (also referred to hereafter simply as 'code') in a variety of programming languages, as pseudo-code, or in some other way.

Figure 1:
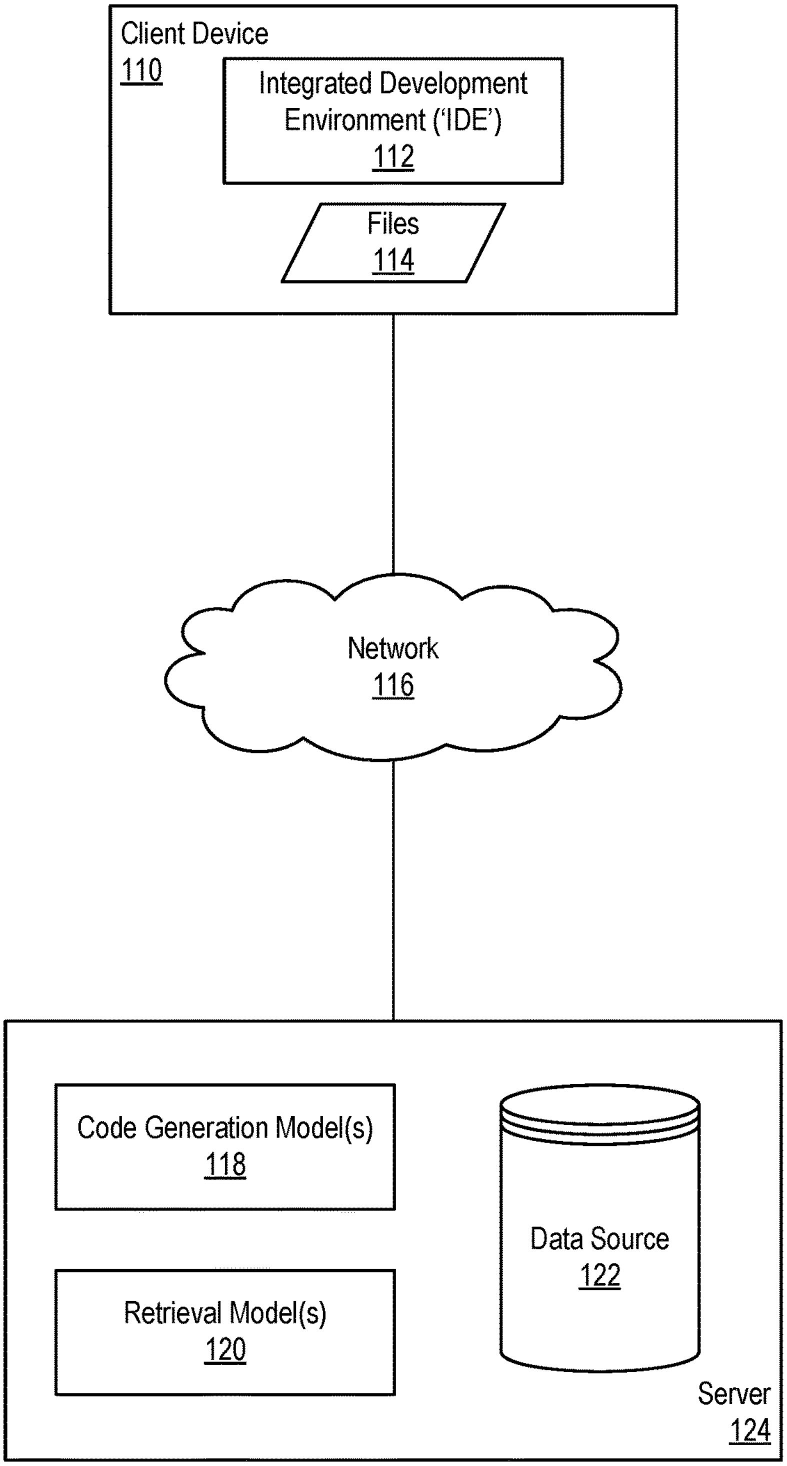
FIG. 1 a block diagram of an example system for enterprise specific code generation using generative artificial intelligence ('AI') in accordance with some embodiments of the present disclosure.

FIG. 1 is a block diagram of an example system in which one or more models are leveraged for enterprise specific code generation using generative AI. FIG. 1 includes a client device 110 and a server 124 that are connected via a network 116. The network 116 depicted in FIG. 1 may be embodied, for example, as a system (including a collection of networking devices, data communications links, and so on) that enables the exchange of digital information between multiple devices (e.g., endpoints), where in this embodiment those devices or endpoints include the client device 110 and the server 124. The network 116 may leverage physical or wireless medium to carry data between nodes using one or more data communications protocols. Such data communications protocols may include the rules and conventions that govern how data is formatted, transmitted, and received within the network 116. Such protocols can include, for example, TCP/IP, HTTP, SMTP, cellular protocols, and many others. Such a network 116 may be embodied as, for example, a Local Area Network ('LAN') that covers a small geographical area, a Wide Area Network ('WAN') that spans larger regions, a Virtual Private Network ('VPN') that uses encryption to create secure and private communication channels, the internet, or in some other way.

The client device 110 depicted in FIG. 1 may be embodied, for example, as a computer, smartphone, tablet, or other computing device that accesses and utilizes services provided by the server 124. The client device 110 will be described in greater detail herein, but the client device 110 may also include one or more applications or user interfaces that allows users of the client device 110 to interact with the server 124, one or more modules of software and hardware that enable the client device 110 to communicate with the server 124 by sending messages, packets, and the like to the server 124, various hardware components such as computer processors, memory, storage, networking interfaces, and much more. The client device 110 may also include one or more displays (e.g., a connected monitor, a touchscreen) and one or more user input devices (e.g., a keyboard, a mouse, a touchscreen) that enable users of the client device 110 to interact with the client device 110.

In the example depicted in FIG. 1, the client device 110 includes an integrated development environment ('IDE') 112. The IDE 112 may be embodied, for example, as a software application that provides an integrated set of tools and features to streamline the software development process. IDEs 112 may be used by developers to write, test, and debug code more efficiently, and may include features to support software development tasks such as coding, debugging, and project management. Examples of IDEs 112 that may be supported by the client device 110 can include, for example, Visual Studio, IntelliJ IDEA, Eclipse, NetBeans, PyCharm, and many others. The particular IDE 112 that is leveraged may depend on the programming language and platform being used.

In the example depicted in FIG. 1, the IDE 112 can include (amongst other modules and features) a code editor, which may be embodied as an interface that is used by a software developer to write, edit, and view source code. The editor may include features like syntax highlighting, code formatting to enhance code readability, and code completion features that may be augmented by interactions with the server 124 as described in greater detail herein.

In the example depicted in FIG. 1, the IDE 112 (or some other tool) may be used to access and/or manage one or more files 114. The one or more files 114 can include, for example, source code files that contain the instructions and logic for the software being developed (written in Java, Python, C++, or some other programming language), header files or other library files, configuration files which may specify settings and parameters for the application being developed, template files, script files, documentation files, configuration files for the IDE 112, and many others.

The server 124 depicted in FIG. 1 may be embodied, for example, as one or more computers (although in other embodiments the server 124 may be embodied as one or more hosted application(s)) that provides services, resources, or data to one or more client devices 110 over a network 116. The server 124 may include dedicated hardware systems designed to handle heavy workloads and ensure reliability, although in other embodiments the server 124 may be implemented through software on standard computers. Specialized server operating systems and software may even be used to optimize performance, security, or for some other purpose.

The server 124 depicted in FIG. 1 includes one or more code generation model(s) 118. The code generation model(s) 118 depicted in FIG. 1 may be embodied, for example, as one or more machine learning models designed to generate executable source code for various programming tasks. The code generation model(s) 118 may utilize natural language processing and machine learning techniques to understand and generate code in programming languages like Python, JavaScript, Java, C-based languages, and others. The code generation model(s) 118 may leverage deep learning architectures, such as recurrent neural networks (RNNs), transformers, or hybrid models that combine convolutional and recurrent layers.

In the examples depicted in FIG. 1, the code generation model(s) 118 may be configured to generate enterprise specific code. In other embodiments, the generated code may not be 'enterprise' specific but may be specific to some other group of users, some other entity that has associated computer code, or any other entity. In some embodiments, the code generation model(s) 118 generate enterprise (or entity) specific code, for example, in the sense that the code generation model(s) 118 are trained on code for a particular enterprise (e.g., a particular business organization, a particular business unit within a particular business organization) or entity, in the sense that code generation model(s) 118 leverage a knowledge base that is specific to some particular enterprise or entity (e.g., the enterprise's codebase), or in some other way. As such, the code generation model(s) 118 depicted here may produce output that is tailored for a specific enterprise or entity as it adheres to their standards, leverages their codebase, is written in their same style, and so on.

The code generation model(s) 118 depicted in FIG. 1 may be configured to consider the context in which the code is generated, as the code generation model(s) 118 can take into account any surrounding code or variables that may influence the code generation process. The code generation model(s) 118 may be used for code completion tasks where the code generation model(s) 118 are used to assist developers by providing code completion suggestions as the developer writes code. That is, the code generation model(s) 118 may (via the IDE 112) be provided with information describing where a user's cursor is positioned within a code editor, what code precedes the cursor, what code follows the cursor, and so on, as inputs to code completion process.

In the example depicted in FIG. 1, the server 124 can also include one or more retrieval model(s) 120. The retrieval model(s) 120 depicted in FIG. 1 may be embodied, for example, as machine learning models used for generating responses or recommendations based on retrieving and selecting relevant pre-existing content from a database or knowledge base (depicted herein as data source 122). The retrieval model(s) 120 may therefore leverage existing data or content to provide responses that are contextually appropriate and accurate. Such retrieval model(s) 120 may therefore rely on a database or knowledge base that contains a pre-existing data that serves as a source of information for generating responses. In FIG. 1, the retrieval model(s) 120 rely on information in the depicted data source 122, where the data source 122 can include, for example, a code repository associated with a particular enterprise or entity, documentation associated with the codebase, and other information that is relevant to code that has been developed by the particular enterprise or entity.

In the example depicted in FIG. 1, the retrieval model(s) 120 may leverage various techniques such as, for example, feature extraction to identify meaningful features from content in the enterprise's code repository and code in the code editor of the IDE 112, similarity scoring or similar techniques to measure similarity between code in the code editor of the IDE 112 and the content in the data source 122, content ranking and selection, and so on. Such retrieval model(s) 120 may, in some embodiments, be combined with generative models (e.g., the code generation model(s) 120) to create hybrid models that leverages the strengths of both retrieval and generative models to produce more contextually relevant code completion recommendations.

In some embodiments, the retrieval model(s) 120 may be configured to generate precomputed latent representations of stored code (e.g., the code in a particular codebase). The latent representation may be embodied, for example, as a floating-point value that captures relevant information about the stored code. Such features may not be directly observed or defined, but instead may be learned by the retrieval model(s) 120 from the raw input data (in this case the stored code). Such latent representations may be made available to the code generation model(s) 118 instead of (or in addition to) the textual representation of the stored code. In such a way, the latent representation may be further processed to encode additional context, deeper understanding, and interconnection with other memories. Furthermore, the systems described herein may refine the latent representations asynchronously and offline (i.e., separately from the process of the code generation model(s) 118 generating code).

In some embodiments, the retrieval model(s) 120 can be enhanced using static analysis of code. Such a process may, in some embodiments, involve statically analyzing existing code (i.e., code from a user's codebase) to pick out some fill-in-the-middle ('FIM') examples. For example, the retrieval model(s) 120 may be trained with examples of what is typically written between a set of parentheses, examples of what is typically written inside a loop, examples of what is typically written to complete a function, and so on.

In some embodiments, the generative AI systems described here may leverage a set of static code analysis heuristics that work well and can be used to create a dataset that is useful for training models used by generative AI systems that can do FIM for computer program code. In these embodiments, models are trained, and training sets are generated to cover sampling at multiple levels of hierarchy (parenthesis, functions, class, etc. . . . ). The training sets are also created with a distribution that is similar to a distribution that would be similar to a user's knowledge base (i.e., their code repository) so that models behave in accordance with the appropriate distribution.

Readers will appreciate that because each client device 110 has its own set of files 114, a software developer using a first client device may have a different set of files than a client software developer using a second client device. For example, the software developer using a first client device may update some function in a particular file, but without actually committing the updated file to a shared codebase (which may involve rounds of review or other version control procedures), the software developer using a second client device may not have access to the updated function in the particular file. As such, it is not abnormal for users of different client devices to have different versions of a shared codebase.

Readers will further appreciate that because each client device 110 can upload its local files to the server 124, the server 124 may generate different code completion recommendations for a user on a first client device 110 that has a first version of a particular file 114 than it would generate for a user on a second client device 110 that has a second version of a particular files 114, given that the different versions of the particular file 114 could result in different input tokens being sent to the code generation model(s) 118 and/or the retrieval model(s) 120. Readers will appreciate that although some files 114 may be distinct between a first client device and a second client device, some other files 114 may be identical (especially for two developers that are working on the same codebase). As such, and to avoid costly duplication, files (or portions thereof) may be deduplicated so that files (or portions thereof) that are common across multiple client devices 110 are only stored once by the server 124.

Figure 2:
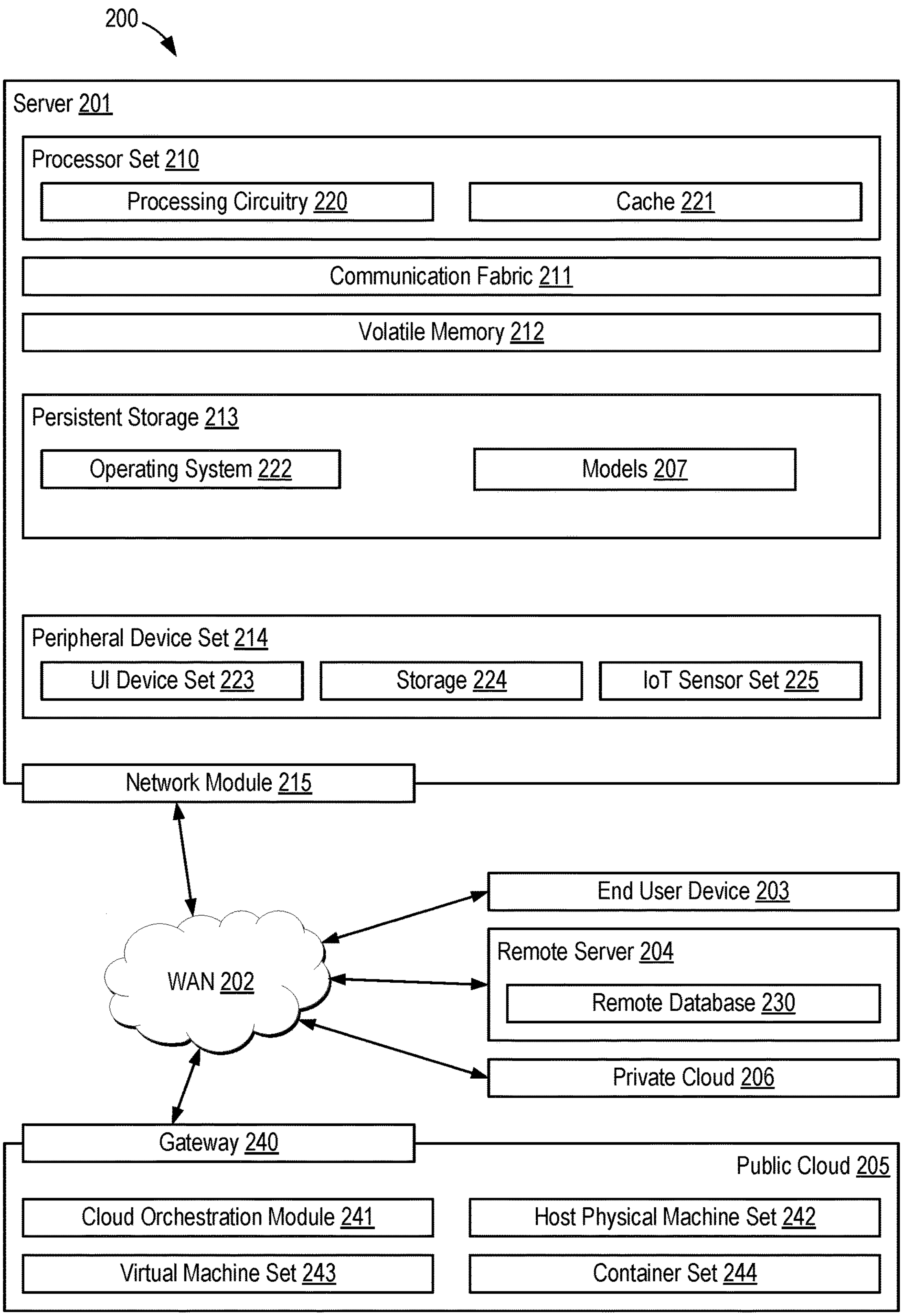
FIG. 2 sets forth a block diagram of an example computing environment configured for enterprise specific code generation using generative AI in accordance with some embodiments of the present disclosure.

For further explanation, FIG. 2 sets forth a block diagram of an example computing environment 200 configured for enterprise specific code generation using generative AI in accordance with some embodiments of the present disclosure. Computing environment 200 contains an example of an environment for the execution of at least some of the computer code involved in performing the inventive methods, such as various models 207 that may correspond to the models described in FIG. 1 and elsewhere in the present disclosure. In addition to models 207, computing environment 200 includes, for example, computer 201, wide area network ('WAN') 202, end user device ('EUD') 203 that may be similar to the client device of FIG. 1, remote server 204, public cloud 205, and private cloud 206. In this example embodiment, computer 201 includes processor set 210 (including processing circuitry 220 and cache 221), communication fabric 211, volatile memory 212, persistent storage 213 (including operating system 222 and models 207), peripheral device set 214 (including user interface ('UI') device set 223, storage 224, and Internet of Things ('IoT') sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in models 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid-state storage devices. Operating system 222 may take several forms, such as various known proprietary operating systems or open-source Portable Operating System Interface-type operating systems that employ a kernel. The models 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network ('SAN') that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks ('LANs') designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device ('EUD') 203 is any computer system that is used and controlled by an end user (for example, a customer of an enterprise that operates computer 201), and may take any of the forms discussed above in connection with computer 201. In some embodiments, the EUD 203 may perform all of the functions of the client device of FIG. 1 and may include the IDE and other components described with reference to FIG. 1 and elsewhere in the present disclosure. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments ('VCEs') typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments ('VCEs') will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
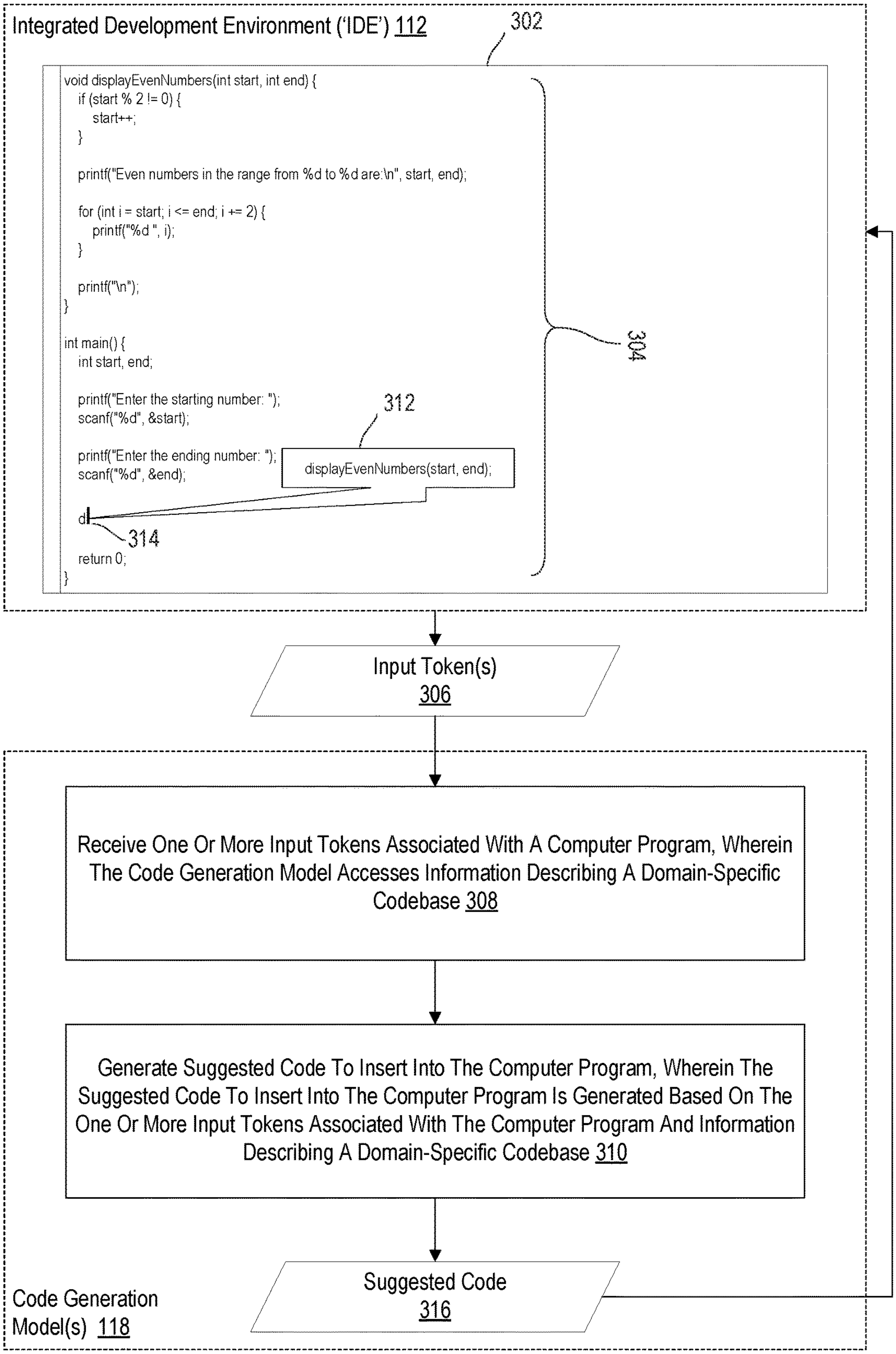
FIG. 3 sets forth a flow chart illustrating an example method of enterprise specific code generation using generative AI in accordance with some embodiments of the present disclosure.

For further explanation, FIG. 3 sets forth a flow chart illustrating an example method of enterprise specific code generation using generative AI in accordance with some embodiments of the present disclosure. The example method depicted in FIG. 3 includes one or more code generation model(s) 118 and an IDE 112 as described elsewhere in the present disclosure.

In the example depicted in FIG. 3, the IDE 112 includes a code editor 302, where a computer program 304 that displays even numbers between two input parameters. In this example, the computer program 304 is intended to be depicted as being in draft, with a software developer drafting code that is included in the computer program 304. More specifically, the software developer's cursor 314 is depicted near the bottom of the computer program 304, as the developer is writing a line of code that begins with the letter "d" followed by the cursor 314. In this example, the code editor 302 is depicted as displaying a recommended code completion 312 that is generated as will be described in greater detail below. The recommended code completion 312 includes a function call to the displayEventNumbers function that is defined in the code editor 302. Readers will appreciate that this example is purposefully intended to be quite simple for ease of explanation, but in other embodiments the recommended code completion 312 may be far more complex, may be presented in other ways, and so on. In fact, although this embodiment illustrates an example in which recommended code completions 312 are presented to a software developer via an IDE 112, in other embodiments the systems, methods, products, modules, or components described herein may be used to automatically generate entire software applications, functions, and so on.

The example method depicted in FIG. 3 includes receiving 308, by a code generation model 118, one or more input tokens 306 associated with a computer program 304. The one or more input tokens 306 may be discrete units of information (e.g., text, some representation of text such as a hash of the text) that are used to as input to the code generation model(s) 118. For example, a first token may include some representation of the text that precedes the location of the cursor 314 in the computer program 304, a second token may include some representation of text that follows the location of the cursor 314, and so on. In fact, many tokens may be generated that represent different portions of the text that precedes the location of the cursor 314, different portions of the text that follows the location of the cursor 314, representations of portions of documentation associated with the computer program 304, representations of libraries that are utilized by the computer program 304, representations infrastructure-as-code ('IaC') templates for the environment that executes the computer program 304, and so on. In such a way, the tokens can essentially represent the state of the computer program 304 that is being developed.

Readers will appreciate that the input tokens 306 can essentially guide the behavior of the code generation model(s) 118 and can be important inputs that drive the output of the code generation model(s) 118. Each input token 306 may be part of a sequence of input tokens 306 that collectively form the input to the code generation model(s) 118. Readers will appreciate that input tokens 306 can be of differing types that may determine how the code generation model(s) 118 interprets and processes each particular input token 306. Readers will further appreciate that the position of each input token 306 in the input sequence signifies the order or context in which the input token 306 appears, as the preceding and following input tokens 306 in the input sequence provides context for a particular input token 306. In such a way, the context helps the code generation model(s) 118 understand the relationships and dependencies between various input tokens 306, thereby helping the code generation model(s) 118 generate accurate and contextually relevant suggested code 316 that can ultimately be presented as a recommended code completion 312 or leveraged in some other way. The input tokens 306 may be generated by the IDE 112 or some other module performing a variety of steps, including preprocessing steps to clean and structure the code data. This process may involve performing tokenization steps, separating code into individual tokens (e.g., keywords, operators, identifiers), removing irrelevant or sensitive information, and performing other preprocessing steps to generate the input tokens 306.

In the example method depicted in FIG. 3, the one or more input tokens 306 associated with the computer program 304 may be generated by the IDE 112, by a plug-in or extension for the IDE 112, by some other module that is accessible by the IDE 112, or by some other intervening module between the IDE 112 and the code generation model(s) 118. The one or more input tokens 306 associated with the computer program 304 may be received 308 by the code generation model(s) 118, for example, via one or more messages that are received by the code generation model(s) 118, via one or more queues or other data structure that the IDE 112 inserts input tokens 306 into and that the code generation model(s) 118 retrieves input tokens 306 from, via the IDE 112 directly writing (e.g., via an RDMA or RDMA-like operation) the input tokens 306 into memory on server (124 in FIG. 1) that supports the execution of the code generation model(s) 118, or in some other way.

In the example method depicted in FIG. 3, the code generation model 118 may access information describing a domain-specific codebase. The domain-specific codebase may be embodied, for example, as the codebase for a particular business enterprise, as the codebase for a particular business unit within a business enterprise, as the codebase for some collection of software developers, as the codebase for some other entity, and so on. The information describing a domain-specific codebase can also include non-code information such as, for example, documentation associated with a codebase, commit histories for code in the codebase, information describing an environment some software in the codebase will be executed, information describing support tickets for code in the codebase, information describing bugs in the codebase and their resolution, information describing whether some code was generated by a human developer or generative AI, information identifying which particular software developer wrote some code in the codebase, performance information gathered during execution of some code in the codebase, environmental information (e.g., schemas in a data warehouse that contains data to be used by the code, cloud infrastructure layout, Remote Procedure Call ('RPC') endpoint configurations) describing the environment that code will be executed in, infrastructure information (e.g., information about a Kubernetes pods that may be running, information about the cloud infrastructure) describing the environment that code will be executed in, and so on. The information describing a domain-specific codebase may be embodied, for example, as the data source (122 of FIG. 1) depicted in FIG. 1. Such information may be inserted into the generated code, used to drive some query, or otherwise used by one or more of the models.

In some embodiments, the code generation model(s) 118 may access information describing a domain-specific codebase, for example, by receiving information from a knowledge base that includes code in the domain-specific codebase. Such information may be received from a trained retrieval model (such as the trained retrieval model(s) 120 depicted in FIG. 1). In some embodiments, the retrieval model(s) may be distinct from the code generation model(s) 118, the retrieval model(s) may be trained on a different training set than the code generation model(s) 118, and so on. In some embodiments, multiple retrieval models may be trained to do the retrieval. These retrieval models may be used, for example, to look at a piece of code (i.e., code that is being written by a developer), compare it to some other code/search the knowledge base for the most relevant piece of code, and then present that relevant piece of code to the developer or to another model. To train these retrieval models, the models may need to be provided with many examples of code that is related so as to enable the model to identify related code. To generate a signal that relates two pieces of code, some embodiments may examine existing code repositories and look at each change that is made in the code repository and identify situations in which changing a first piece of code was followed by a second piece of code being changed, as this may be indicative of the first piece of code and the second piece of code being related. This may be especially true in some situations such as, for example, when the same user changed each piece of code in a relatively short period of time. In these embodiments, commit histories from a code management system may be examined to identify the activity described above, or other data sources may be examined to identify activity that may be taken as a signal that some pieces of code are related. In other embodiments, other information may be indicative that some pieces of code are related. For example, if two pieces of code are described in the same document (e.g., a design document), this may be an indication that the two pieces of code are related. Readers will appreciate that such signals (and other signals) may be fairly specific to code rather than language generally, so these signals may be more useful when training retrieval models that are part of a generative AI system that generates computer program code.

In some embodiments, the code generation model(s) 118 may access information describing a domain-specific codebase by retrieving, from a database that includes memories generated by examining the domain-specific codebase, one or more memories. In some embodiments one or more models are trained to store a memory corresponding to each of a plurality of tokens in a database. In such embodiments, models trained to store memories are trained from a corpus of words obtained from a specific enterprise (e.g., a domain or an entity), allowing the memories to reflect contextual information about usage of tokens in the specific enterprise. By using enterprise-specific information to generate memories for tokens, the model is able to account for a specific implementation environment and leverage preferences or criteria specific to the specific domain. For example, a code generation model 118 may be configured to leverage memories when generating suggested code 316 to insert into the computer program 304, where the memories account for coding preferences or specific libraries particular to an enterprise, such as an entity or an organization. This allows different enterprises to use a code constructs, functions, words, or other elements in a computer program in different ways or in different contexts, with the memories generated by the trained model accounting for the enterprise specific usage. In such a way, memories allow the code generation model(s) 118 to provide suggested code 316 that are tailored to the enterprise.

The example method depicted in FIG. 3 also includes generating 310, by the code generation model(s) 118, suggested code 316 to insert into the computer program 304. In the example method depicted in FIG. 3, the suggested code 316 to insert into the computer program 304 is generated based on the one or more input tokens 306 associated with the computer program 304 and information describing a domain-specific codebase.

The code generation model(s) 118 may generate 310 suggested code 316 to insert into the computer program 304, for example, by receiving an initial code snippet (or even a natural language description of a code) in the form of input tokens 306 and predicting the next token in the sequence (or intervening token when the input tokens 306 include tokens before and after a cursor or other reference point). In such an example, the code generation model(s) 118 may generate 310 suggested code 316 in the form of tokens that are generated one by one, taking into account the context provided by the preceding tokens. The code generation model(s) 118 may maintain an internal state that keeps track of the context of the code it is generating, where the context can include variables, function declarations, loops, conditionals, and other elements that are used to generate code that follows a logical and semantically correct structure. The code generation model(s) 118 may therefore be designed to understand and replicate the structure, syntax, and semantics of programming languages and computer programs that the code generation model(s) 118 can access, including those computer programs that are part of the domain-specific codebase. Readers will appreciate that the code generation model(s) 118 may generate code up to a specified length, until a specific stop token is reached, or in some other way.

Figure 4:
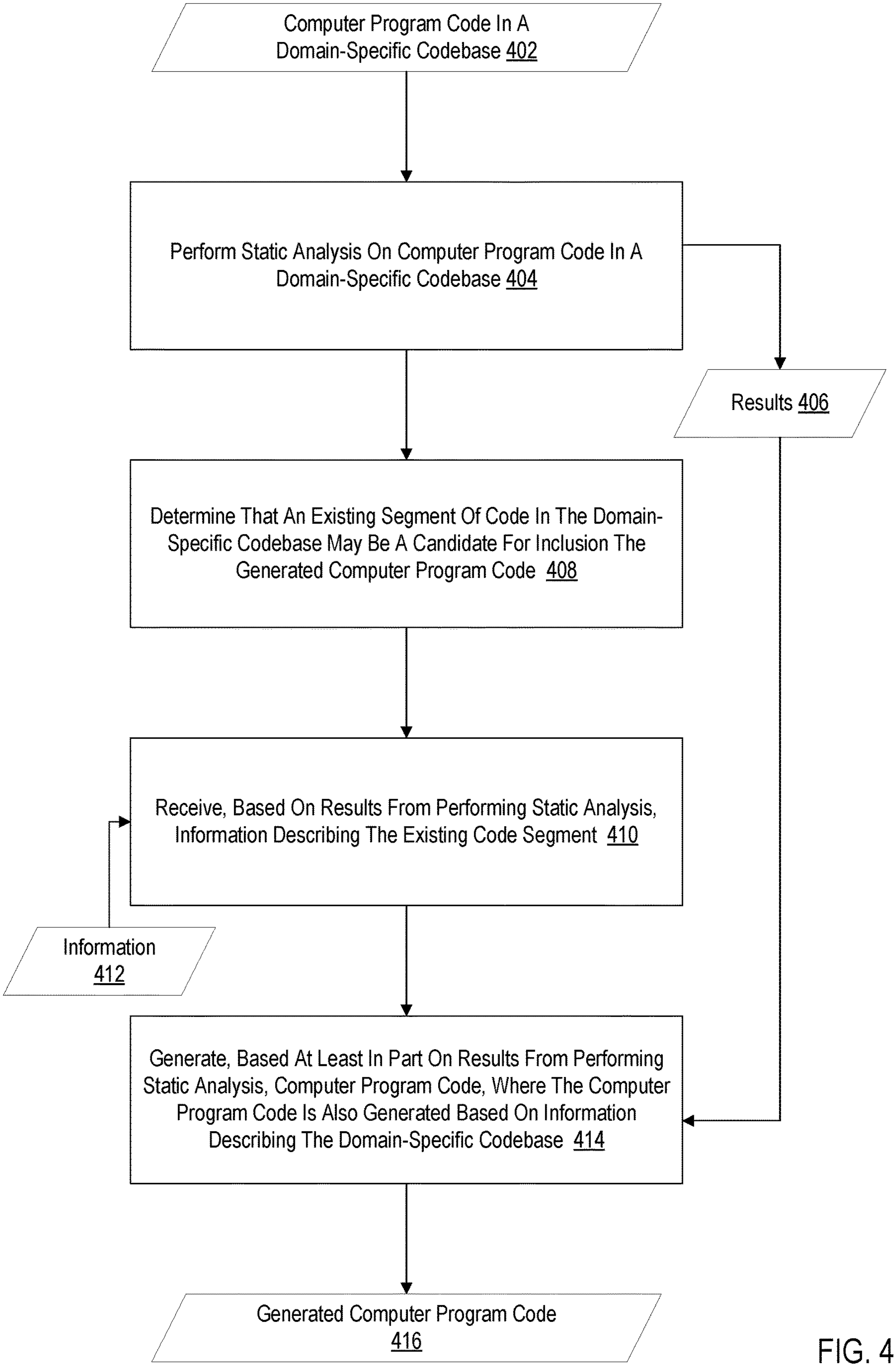
FIG. 4 sets forth a flow chart illustrating an example method of improving code models with static analysis in accordance with some embodiments of the present disclosure.

For further explanation, FIG. 4 sets forth a flow chart illustrating an example method of improving code models with static analysis in accordance with some embodiments of the present disclosure. The example method depicted in FIG. 4 may be carried out, for example, by one or more modules that are executing on the server depicted in FIG. 1, by one or more modules that are executing on the client device depicted in FIG. 1, or by some combination thereof.

The example method depicted in FIG. 4 includes performing 404 static analysis on computer program code in a domain-specific codebase 402. Static analysis of computer program code is a method used in software development and related fields whereby the computer program code is examined without actually executing the computer program code. Static analysis may be performed by specialized tools such as static analyzers. Static analysis can include examining computer program code by performing functions such as syntax checking, analyzing code complexity, evaluating the computer program code for adherence to coding styles and standards, analyzing the computer program code to identify dependencies between different parts of the code or other code, and so on.

Performing 404 static analysis on computer program code in a domain-specific codebase 402 may be carried out, for example, by using specialized tools (e.g., Pylint, Checkstyle, ESLint, and so on) to analyze the computer program code without actually executing the computer program code in the domain-specific codebase 402. In such an example, a command line interface ('CLI') or other interface may be used to execute the appropriate static analysis tool on the domain-specific codebase 402. In such a way, results 406 from performing static analysis may be generated in the form of one or more reports for issues identified by the static analysis tool, or in some other form.

The example method depicted in FIG. 4 also includes determining 408 that an existing segment of code in the domain-specific codebase may be a candidate for inclusion the generated computer program code 416. Determining 408 that an existing segment of code in the domain-specific codebase may be a candidate for inclusion the generated computer program code 416 may be carried out, for example, as described above with respect to identifying potential code completions for code that is being developed in an IDE. Determining 408 that an existing segment of code in the domain-specific codebase may be a candidate for inclusion the generated computer program code 416 may therefore be carried out by: 1) receiving 308, by a code generation model 118, one or more input tokens 306 associated with a computer program 304, 2) generating 310, by the code generation model(s) 118, suggested code 316 to insert into the computer program 304, and performing other steps as described above. In such an example, the suggested code 316 would be a candidate for inclusion the generated computer program code 416.

In the example method depicted in FIG. 4, the code generation model(s) 118 may determine 408 that an existing segment of code in the domain-specific codebase may be a candidate for inclusion the generated computer program code 416, for example, by receiving an initial code snippet (or even a natural language description of a code) in the form of input tokens 306 and predicting the next token in the sequence (or intervening token when the input tokens 306 include tokens before and after a cursor or other reference point), where those next tokens are based on existing segments of code in the domain-specific codebase. In such an example, the code generation model(s) 118 may identify code from the domain-specific codebase as candidates for inclusion the generated computer program code 416 in the form of tokens that are generated one by one, taking into account the context provided by the preceding tokens. The code generation model(s) 118 may maintain an internal state that keeps track of the context of the code it is generating, where the context can include variables, function declarations, loops, conditionals, and other elements that are used to generate code that follows a logical and semantically correct structure. The code generation model(s) 118 may therefore be designed to understand and replicate the structure, syntax, and semantics of programming languages and computer programs that the code generation model(s) 118 can access, including segments of code that are part of the domain-specific codebase.

Although the example described here relates to an embodiment where existing segment of code in the domain-specific codebase may be a candidate for inclusion the generated computer program code 416, readers will appreciate that a modified version of an existing segment of code in the domain-specific codebase may actually be a candidate for inclusion the generated computer program code 416. That is, the existing segment of code in the domain-specific codebase may be something that is analogous to a template for code that is to be included in the generated computer program code 416.

The example method depicted in FIG. 4 also includes receiving 410, based on results 406 from performing static analysis, information 412 describing the existing code segment. The information 412 describing the existing code segment may include information such as, for example, a definition of the existing code segment (e.g., a function definition, a class definition) that includes information such as an identifier used to call the existing code segment (e.g., a function name, a class name), an identification of the arguments to the existing code segment, an identification of the return type of the existing code segment, an identification of libraries used by the existing code segment, and so on. In such a way, the information 412 describing the existing code segment may provide context that can be leveraged to determine how to call the existing code segment, how to format input parameters to the existing code segment, or other information that can be useful when potentially inserting the existing code segment into a code completion recommendation or into other generated code.

The example method depicted in FIG. 4 also includes generating 414, based at least in part on results 406 from performing static analysis, computer program code 416. While many aspects of generating 414 computer program code 416 may be carried out as described above (e.g., as described with step 310 of FIG. 3) and in other points within the present disclosure, in the example method depicted in FIG. 4 such computer program code 416 is generated 414 based at least in part on results 406 from performing static analysis. For example, if the generated 414 computer program code 416 includes a call to some existing function in the domain-specific codebase, the results 406 from performing static analysis on the codebase can be used to understand the order and type of input parameters that are needed properly structure the function call. In another example, if the generated 414 computer program code 416 includes a call to some existing function in the domain-specific codebase that is part of a library in the domain-specific codebase, the results 406 from performing static analysis on the codebase can be used to ensure that the generated 414 computer program code 416 has an include statement or similar construct to allow the generated 414 computer program code 416 to access the relevant library in the domain-specific codebase.

Readers will appreciate that although the examples described above relate to embodiments where static analysis is performed 402 on some portion of the domain-specific codebase and the results 406 of performing static analysis are used when generating 414 computer program code 416, in some embodiments the generated 414 computer program code 416 itself may be evaluated using static analysis to further refine the generated 414 computer program code 416. For example, the generated 414 computer program code 416 may be passed through a compiler and, if compilation errors or warnings are discovered, the results of such compilation may be leveraged to further modify the generated 414 computer program code 416. In fact, the results of compiling the generated 414 computer program code 416 (e.g., the results of performing static analysis on the generated code) may even be used to modify code in the domain-specific codebase (e.g., if compilation reveals some error or defect in code from the domain-specific codebase). In such a way, a feedback loop (with any number of cycles) may be created such that code generation is improved through the use of static analysis techniques.

In the example method depicted in FIG. 4, the computer program code 416 is also generated based on information 412 describing the domain-specific codebase. As described above, one or more existing segments of code in the domain-specific codebase may be determined 408 to be candidates for inclusion the generated computer program code 416. Ultimately one of those candidate segments of code in the domain-specific codebase will be included in the generated computer program code 416. The particular code from the domain-specific codebase that is actually included in the generated computer program code 416 may be selected, for example, in response to user input via an IDE, based on a ranking of the candidates, or in some other way.

Figure 5:
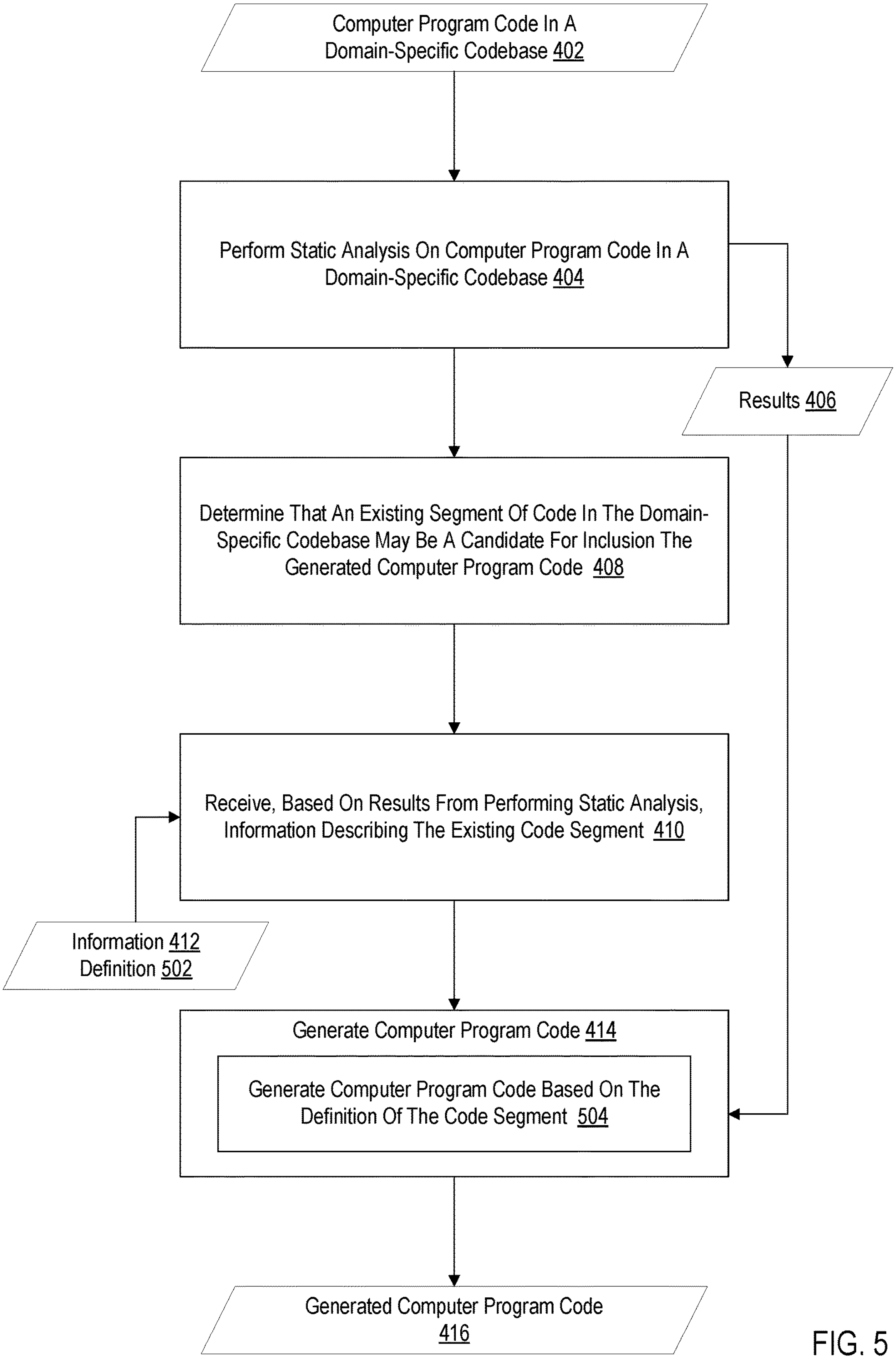
FIG. 5 sets forth a flow chart illustrating an additional example method of improving code models with static analysis in accordance with some embodiments of the present disclosure.

For further explanation, FIG. 5 sets forth a flow chart illustrating an additional example method of improving code models with static analysis in accordance with some embodiments of the present disclosure. The example method depicted in FIG. 5 is similar to the method depicted in FIG. 4 as it includes many of the same steps.

In the example method depicted in FIG. 5, the information 412 describing the existing code segment in the domain-specific codebase includes a definition 502 of the code segment. The definition 502 of the code segment may be embodied, for example, as a description of the code segment that includes information such as input parameters to the code segment, the purpose of the code segment, the name of the code segment (or handle used to invoke it), a return value (if any) for the code segment, information describing any side effects or exceptions the code segment may raise, and so on.

In the example method depicted in FIG. 5, generating 414 computer program code 416 can include generating 504 computer program code 416 based on the definition 502 of the code segment. Generating 504 computer program code 416 based on the definition 502 of the code segment may be carried out, for example, by tailoring the generated 504 computer program code 416 such that the generated code calls the code segment using the name identified in the definition 502, passes input values that are consistent with the parameters expected by the code segment as outlined in the definition, and so on. In such a way, while previous usages of the code segment in the domain-specific code base may exist, by leveraging an abstracted definition 502 of the code segment, generated 504 computer program code 416 that includes the code segment may modified (i.e., relative to previous usages in the domain-specific codebase) to be appropriate for its usage in the context of the generated 504 computer program code 416.

Figure 6:
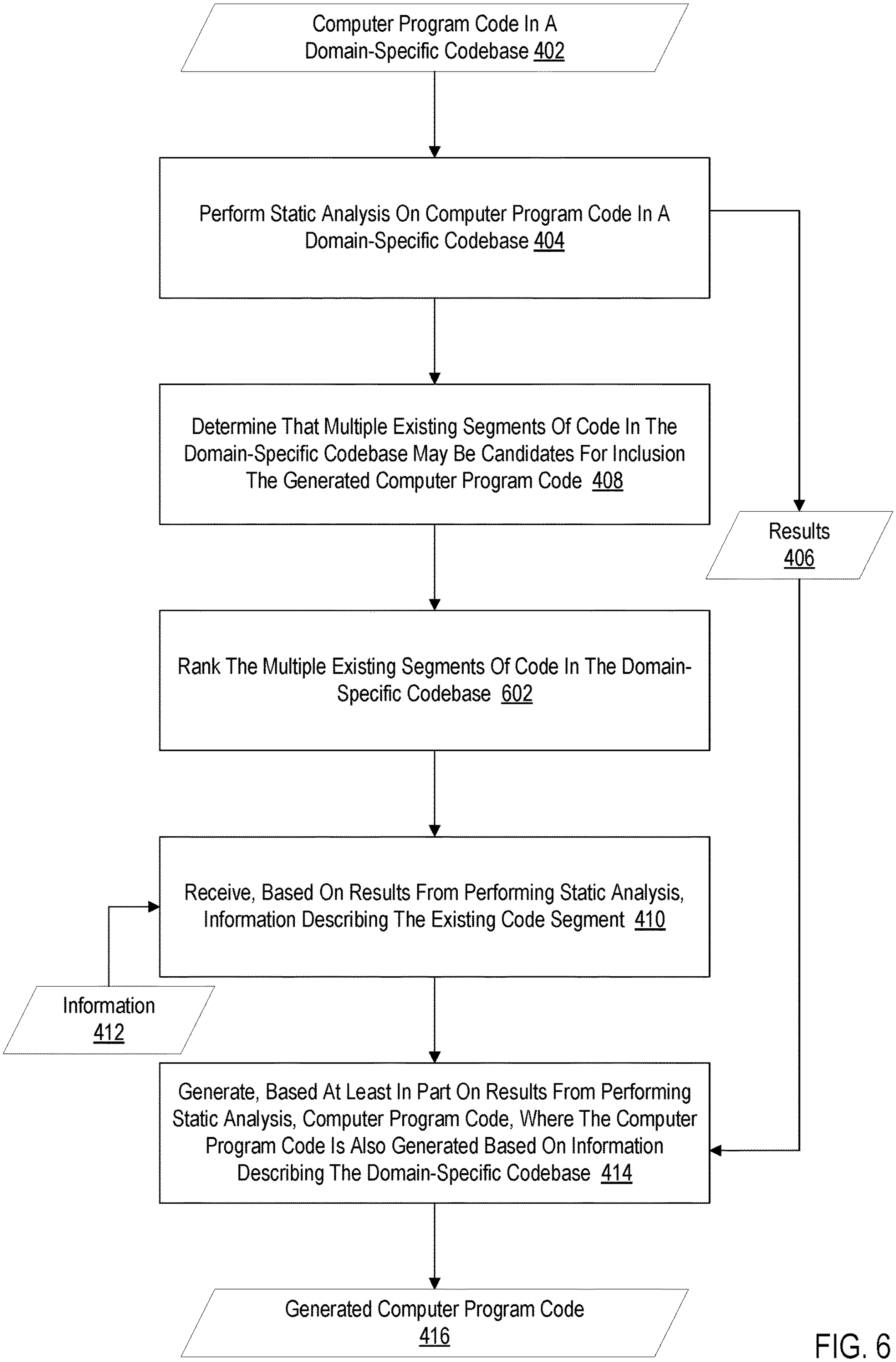
FIG. 6 sets forth a flow chart illustrating an additional example method of improving code models with static analysis in accordance with some embodiments of the present disclosure.

For further explanation, FIG. 6 sets forth a flow chart illustrating an additional example method of improving code models with static analysis in accordance with some embodiments of the present disclosure. The example method depicted in FIG. 6 is similar to the methods depicted in FIG. 4 and FIG. 5 as it includes many of the same steps.

In the example method depicted in FIG. 6, multiple existing segments of code in the domain-specific codebase are candidates for inclusion in the generated computer program code 416. Readers will appreciate that in some embodiments multiple existing segments of code in the domain-specific codebase are candidates for inclusion the generated computer program code 416 because, for example, there are multiple code segments in the domain-specific codebase that are similar, there are multiple code segments in the domain-specific codebase that are sufficiently similar to code that is being developed in an IDE, the IDE is configured to present a predetermined number of code completion recommendations, or for some other reason.

The example method depicted in FIG. 6 also includes ranking 602 the multiple existing segments of code in the domain-specific codebase. Ranking 602 the multiple existing segments of code in the domain-specific codebase may be carried out, for example, using a neural ranker. A neural ranker is a type of machine learning model, specifically a neural network, that is trained to rank items based on their relevance to a given query or input—in this case the items being existing segments of code in the domain-specific codebase and the query or input being a description of code to be generated, code being developed in an IDE, or similar input. Such a neural ranker may be trained, for example, using pairs of examples where each pair consists of a query and two or more items, with one item considered more relevant than the others. In such a way, the neural ranker learns to assign higher scores to more relevant items compared to less relevant ones. The neural ranker can include a neural network architecture that takes the input representations and produces a numerical score for each item. This architecture may include layers such as feedforward layers, recurrent layers, or attention mechanisms, depending on the complexity of the task and the nature of the input data.

Ranking 602 the multiple existing segments of code in the domain-specific codebase may therefore involve preparing the existing segments of code for training the model (i.e., the neural ranker), gathering a dataset containing examples of queries (e.g., descriptions of code to be generated, examples of code being developed in an IDE) and their corresponding items (e.g., existing segments of code in the domain-specific codebase) ranked by relevance, converting the queries and items into numerical representations that can be fed into a neural network, and so on. Once the model is trained and validated, it can be used to make predictions on new queries and items.

In the example method depicted in FIG. 6, the generated 414 computer program code 416 is based on results from ranking the multiple existing segments of code in the domain-specific codebase. More specifically, the code generation model may be configured to generate 414 computer program code 416 that includes highly ranked segments of code in the domain-specific codebase (or code that is modeled off of highly ranked segments of code in the domain-specific codebase).

Figure 7:
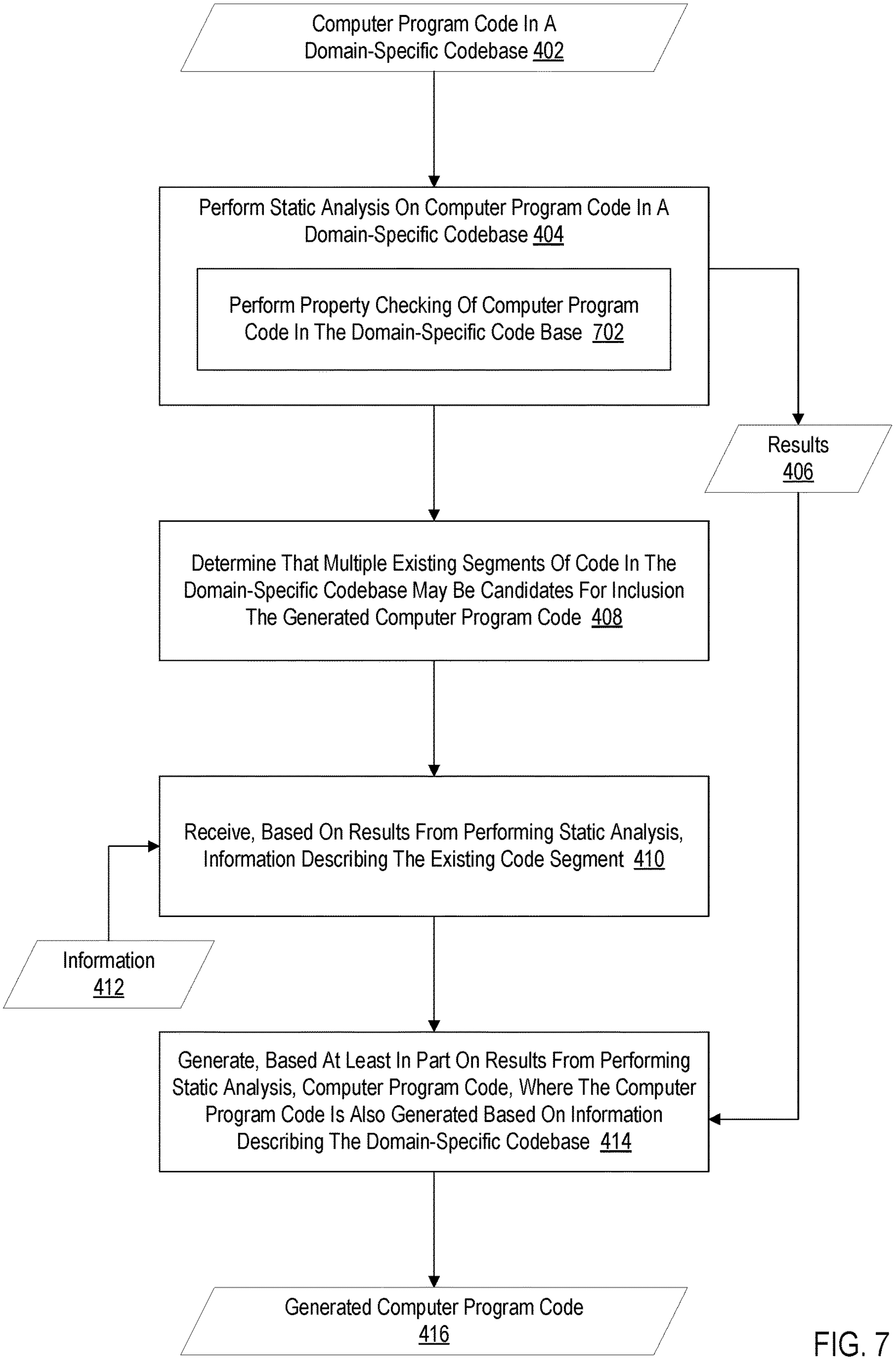
FIG. 7 sets forth a flow chart illustrating an additional example method of improving code models with static analysis in accordance with some embodiments of the present disclosure.

For further explanation, FIG. 7 sets forth a flow chart illustrating an additional example method of improving code models with static analysis in accordance with some embodiments of the present disclosure. The example method depicted in FIG. 7 is similar to the methods depicted in FIGS. 4-6 as it includes many of the same steps.

The example method depicted in FIG. 7 also includes performing 702 property checking of computer program code in the domain-specific codebase. Performing 702 property checking of computer program code in the domain-specific codebase may be carried out, for example, using formal verification or other techniques where the computer program code in the domain-specific codebase is verified to satisfy a set of specified properties or requirements. Such properties or requirements may include, for example, safety properties (e.g., absence of runtime errors, absence of various vulnerabilities, absence of malware, and so on), correctness properties (e.g., adherence to a specific algorithm or invariants, absence of memory leaks), privacy properties (e.g., absence of PII being exposed, application of obfuscation policies), compliance properties (e.g., adherence to various regulatory requirements), and so on. Such properties may be expressed, for example, using a formal specification language to describe the intended behavior of the computer program code in the domain-specific codebase. Performing 702 property checking of computer program code in the domain-specific codebase may be carried out, for example, using automated tools to analyze the code and verify whether it satisfies the specified properties.

In the example method depicted in FIG. 7, the generated 414 computer program code 416 is based on results from performing 702 property checking. More specifically, the code generation model may be configured to generate 414 computer program code 416 that includes segments of code in the domain-specific codebase (or code that is modeled off of highly ranked segments of code in the domain-specific codebase) that have been property checked and, if necessary, modified to meet the desired properties. In fact, in some embodiments, segments of code in the domain-specific codebase may be tagged with metadata indicating whether the segments of code in the domain-specific codebase has been property checked. In the event that the segments of code in the domain-specific codebase has not been property checked, property checking may be performed 702 on the segments of code in the domain-specific codebase prior to using such segments in the code generation process.

Figure 8:
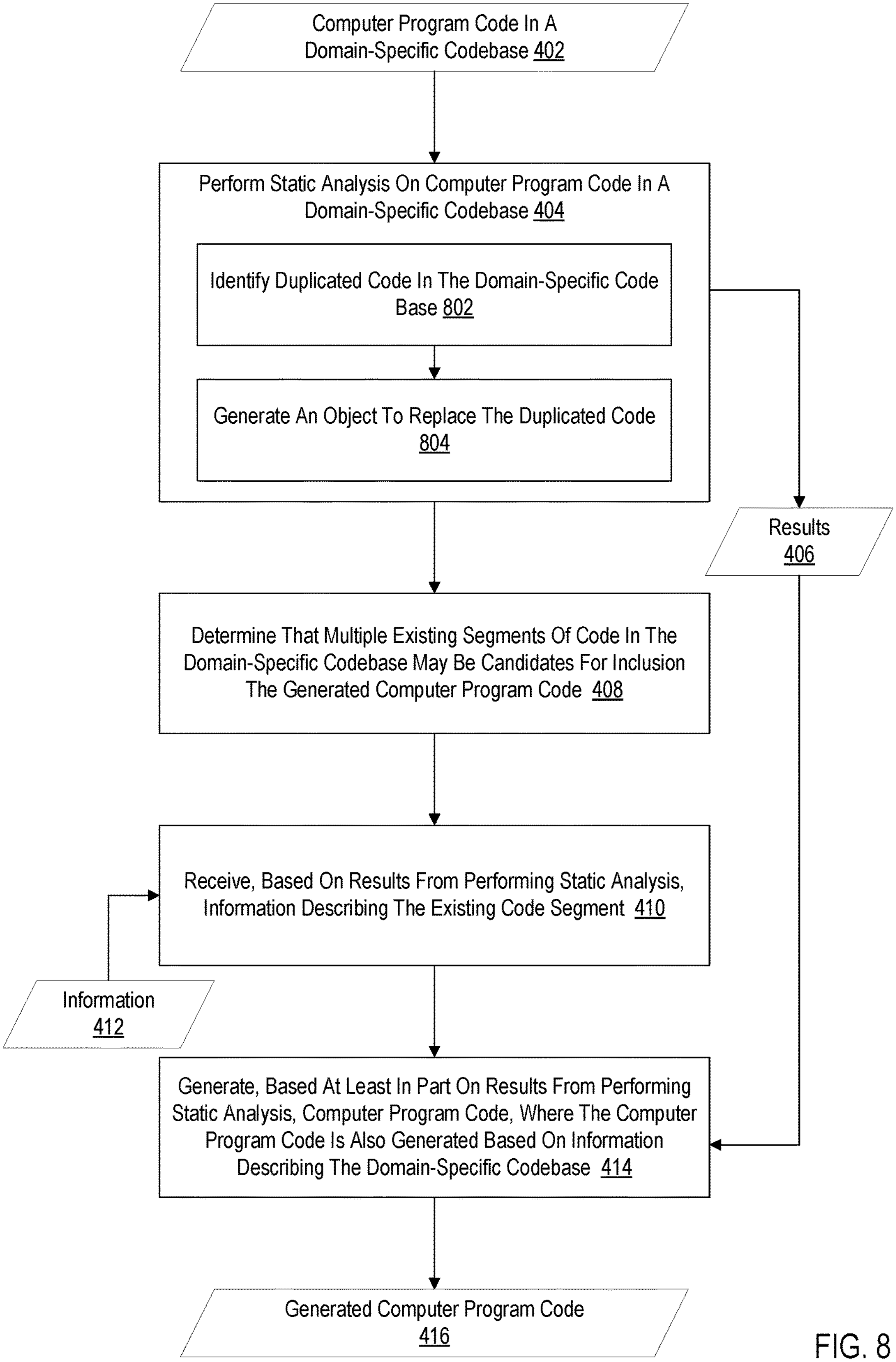
FIG. 8 sets forth a flow chart illustrating an additional example method of improving code models with static analysis in accordance with some embodiments of the present disclosure.

For further explanation, FIG. 8 sets forth a flow chart illustrating an additional example method of improving code models with static analysis in accordance with some embodiments of the present disclosure. The example method depicted in FIG. 8 is similar to the methods depicted in FIGS. 4-7 as it includes many of the same steps.

The example method depicted in FIG. 8 also includes identifying 802, based on results 406 from performing static analysis, duplicated code in the domain-specific codebase. Readers will appreciate that duplicated code may be replaced using a common object, a predefined API call, or in some other way to ensure that frequently used code is deployed and utilized in a standardized and controlled way. Identifying 802 duplicated code in the domain-specific codebase may be carried out, for example, using linting tools and static code analyzers that include duplication detection features (e.g., tools such as PMD, ESLint, and FindBugs), using clone detection tools specifically for detecting code clones, using Copy-Paste Detectors ('CPDs'), using built-in features or plugins in an IDE that can highlight or identify duplicated code, using tools that examine the version control history of the codebase, using similarity analyzers, or in some other way.

The example method depicted in FIG. 8 also includes generating 804 an object to replace the duplicated code. Generating 804 an object to replace the duplicated code may be carried out, for example, by using a code generation model to generate the object, by receiving the generated object from an IDE in which the object was developed, or in some other way. Although the example described above relates to an embodiment where an object is generated 804 to replace the duplicated code, in other embodiments a function may be generated, a class may be generated, or some other code segment that can be invoked by other computer program code can be generated.

In the example method depicted in FIG. 8, the generated 414 computer program code 416 can include a reference to the generated object. More specifically, the code generation model may be configured to generate 414 computer program code 416 that includes calls to the generated object in lieu of including an instance of the duplicated code. In fact, in some embodiments, the generated 414 computer program code 416 (i.e., the code generated by the code generation models) may be evaluated to identify 802 duplicated code in the generated 414 computer program code 416. The generated 414 computer program code 416 may include code that is duplicated in the generated 414 computer program code 416 itself or duplicated in the codebase.

Figure 9:
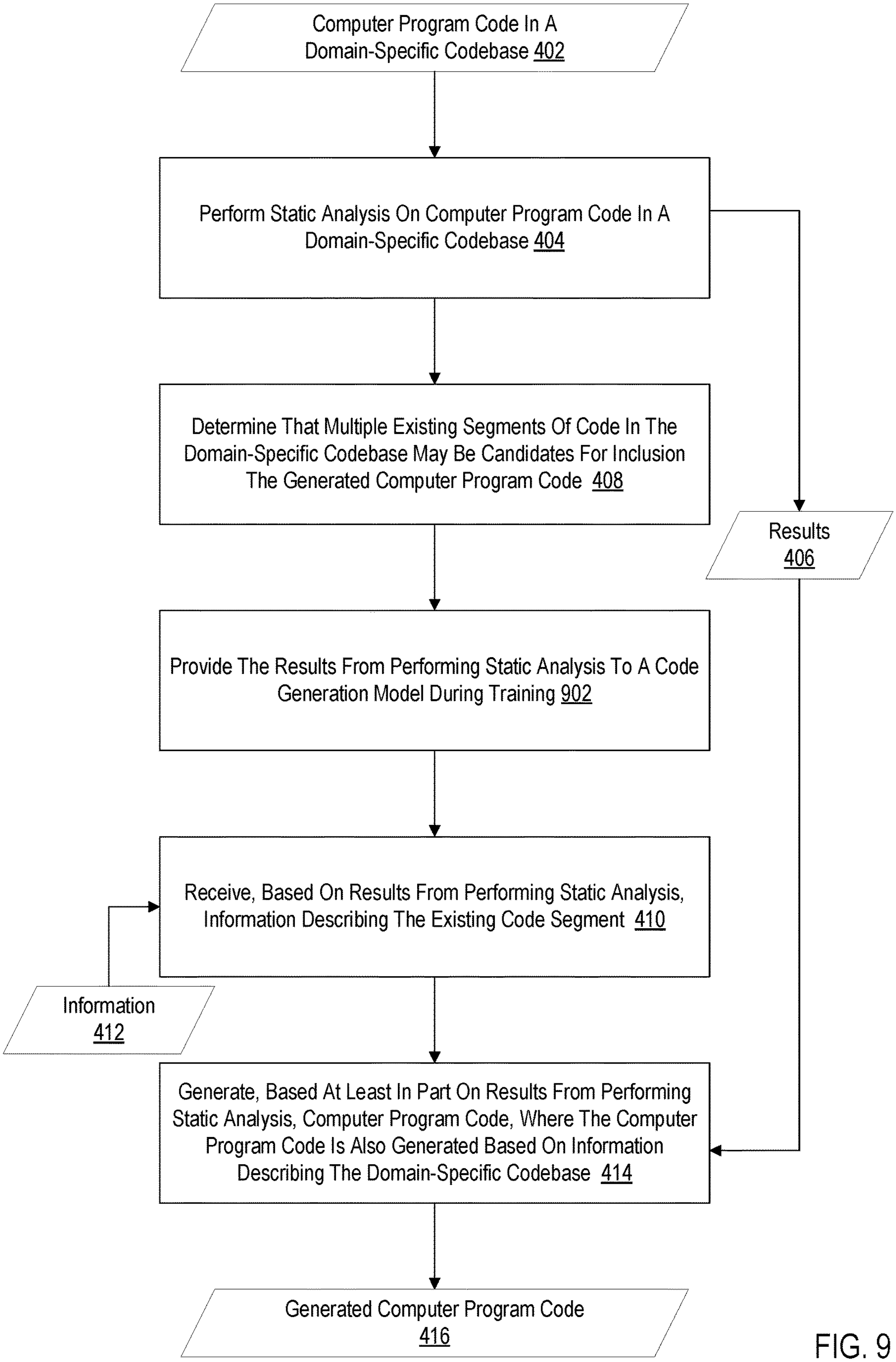
FIG. 9 sets forth a flow chart illustrating an additional example method of improving code models with static analysis in accordance with some embodiments of the present disclosure.

For further explanation, FIG. 9 sets forth a flow chart illustrating an additional example method of improving code models with static analysis in accordance with some embodiments of the present disclosure. The example method depicted in FIG. 9 is similar to the methods depicted in FIGS. 4-8 as it includes many of the same steps.

The example method depicted in FIG. 9 also includes providing 902 the results 406 from performing 404 static analysis to a code generation model during training. Providing 902 the results 406 from performing 404 static analysis to a code generation model during training can enhance the code generation model's ability to adhere to coding standards, learn patterns, avoid common issues that can be identified by static analysis tools, and so on. Providing 902 the results 406 from performing 404 static analysis to a code generation model during training may be carried out, for example, performing static analysis on a codebase to identify issues such as potential bugs, coding style violations, and so on. The results of the static analysis may be used to create a training dataset that includes labeled output from the static analysis (i.e., labeled with an identification of the identified issue), and subsequently training the code generation model to take into account both the code from the domain-specific codebase and the results 406 from performing 404 static analysis. In some embodiments, an iterative process may be performed where static analysis is performed, the model is trained using results 406 from performing 404 static analysis, static analysis is performed again, the model is trained again using results 406 from performing 404 static analysis, and so on. By including the results 406 from performing 404 static analysis into the model training process, the code generation model can learn from both examples of correct code as well as examples of issues identified in incorrected code by static analysis tools.

Readers will appreciate that in some embodiments, as an alternative to providing 902 the results 406 from performing 404 static analysis to a code generation model during training (or in addition to providing 902 the results 406 from performing 404 static analysis to a code generation model during training), the results 406 from performing 404 static analysis may be leveraged as part of a retrieval augmented generation deployment where the trained code generation models are supplemented with retrieval from a knowledge base that includes the results 406 from performing 404 static analysis. This embodiment may represent a hybrid approach in generative AI where elements of both retrieval and generation models are combined. In this approach, a retrieval mechanism is used to fetch relevant information or context, which is then utilized by a generation model to produce a coherent and context-aware response.

Readers will appreciate that in some embodiments, the steps described above (performing static analysis on computer program code in a domain-specific codebase; determining that an existing segment of code in the domain-specific codebase may be a candidate for inclusion the generated computer program code; receiving, based on results from performing static analysis, information describing the existing code segment; generating, based at least in part on results from performing static analysis, computer program code, wherein the computer program code is also generated based on information describing the domain-specific codebase; and others) may be carried out by one or more modules on a client device such as the client device of FIG. 1. In other embodiments, such steps may be performed by a server such as the server of FIG. 1 or with the assistance of such a server. For example, such a server may be configured to: perform static analysis on computer program code in a domain-specific codebase; determine that an existing segment of code in the domain-specific codebase may be a candidate for inclusion the generated computer program code; receiving, based on results from performing static analysis, information describing the existing code segment; and generating, based at least in part on results from performing static analysis, computer program code, wherein the computer program code is also generated based on information describing the domain-specific codebase.

Readers will appreciate that although the embodiments described above are discussed in the context of generating code completion recommendations, the techniques described above may also be used for any other form of automatic code generation. Automatic code generation may refer to the process of using tools or systems to create code automatically based on high-level specifications, models, or templates. Automatic code generation may be associated with model-driven development approaches, where developers create models that describe the desired functionality, and the code is generated from these models. In other embodiments, code can be generated from high-level specifications, diagrams, or other abstract representations. In contrast, code completion is a feature provided by code editors, IDEs, or similar tools that assists developers by automatically suggesting and completing code as they type. While automatic code generation is focused on creating entire pieces of code, code completion is focused on assisting developers in completing or suggesting code elements during the coding process.

Readers will appreciate that while some the examples described above relate to embodiments where a client device leverages an IDE 112 that is used to receive suggested code and present code completion recommendations to a software developer or similar user, readers will appreciate that other embodiments are within the scope of the present disclosure. More specifically, the server or code generation model(s) 118 may be used to provide suggested code or code completion recommendations to other entities (e.g., clients other than an IDE 112 on a client device). Readers will appreciate that the client may be any type of a software development tool that software developers (or other entities that create software/code) interact with. Clients may include not only IDEs, but also code review tools, code hosting tools (e.g., GitHub), collaboration tools (like Slack or Notion), AI agents, and so on. Readers will further appreciate that a client of the server or code generation model(s) 118 may run, for example, on a software developer's computer (as is the case with an IDE), on a server or in the cloud (e.g., code review tools, code hosting tools, AI agents), or in some other environment.

In some embodiments, a client device presents content to a user via one or more output devices (e.g., a display, a speaker, a tactile feedback system, etc.) and receives one or more inputs from a user through one or more input devices (e.g., a keyboard, a touchscreen, a mouse, etc.). In various embodiments, content presented to the user via the client device is retrieved from one or more files locally stored by the client device. The files from which content is displayed to the user are obtained by the client device from a server or from another source in some embodiments. In other embodiments, the files are locally generated at the client device based on inputs received from the user and stored by the client device. In various embodiments, the client device includes one or more volatile or non-volatile storage devices for storing files generated by a user or obtained from another source.

A server used in some embodiments may include a trained model and a knowledge base. The knowledge base may include, for example, information describing the codebase of a particular organization, business unit, or other entity. As further described herein, a trained model may be applied to a corpus of tokens, such as words, and outputs data (ultimately generating computer program code or recommended computer program code). Additionally, a trained model may receive input comprising tokens, such as multiple words, and outputs one or more suggested tokens that are based on the input token. When generating one or more suggested tokens, the trained model can account for both the input tokens and information contained in the knowledge base, allowing the trained model to account for a greater amount of information, both from the knowledge base and from the input tokens, to generate the suggested tokens.

In various embodiments, the server includes one or more graphics processing units ('GPUs') that execute instructions comprising one or more trained models. In other embodiments, the server includes one or more processors that execute instructions comprising one or more trained models. Further, in various embodiments, the server includes an application programming interface ('API') layer that exchanges data with one or more client devices. For example, the API layer may receive one or more input tokens from a client device and routes the one or more input tokens to one or more trained models; one or more output tokens from a trained model are obtained by the API layer, which transmits the one or more output tokens to the client device. Further, the API layer may receive files that are provided to a trained model, which may generate information describing an organization's codebase that are stored in the knowledge base.

Reader will appreciate that while many of the embodiments described above relate to embodiments where information describing a domain-specific codebase is used to generate suggested code or code completion recommendations, in other embodiments, other types of natural language-based content may be generated. For example, the model(s) described here (or other/additional models) may be used to generate explanations, documentation, dialog, code review comments, or some other type of natural language-based content that can be improved by using knowledge of the domain-specific codebase. In such a way, the natural language-based content may be tailored to include information associated with the domain-specific codebase, the natural language-based content may be associated with particular code from the domain-specific codebase, or the natural language-based content may otherwise be generated in a way that has awareness of the domain-specific codebase.

To leverage a corpus of tokens (e.g., words) available to the trained model, the trained model may access tokens or other information from the knowledge base, which may be embodied as words, phrases, or other data in various embodiments. In some embodiments, the content in the knowledge base is obtained from enterprise-specific files or data (e.g., such as the contents of an enterprise-specific codebase), allowing the knowledge base to reflect enterprise-specific usage of tokens, combinations of tokens, and so on. In some embodiments, the source of the tokens includes text data from which tokens (e.g., words) are obtained, while in other embodiments a trained model is trained using images to which the trained model is applied. The knowledge base may allow the trained model to subsequently make use of the enterprise-specific examples of code to generate an output when an input is received. In some embodiments, other information may be included in the knowledge base or used to generate content in the knowledge base. For example, other files related to the files of code, such as documentation, may be included in the knowledge base (or used to generate content contained in the knowledge base or to generate output by a trained model) in various embodiments. Furthermore, files relating to a particular field, such as legal documents, a question-and-answer knowledge base, mathematical reasoning, or information may be retained in the knowledge base or used to generate content in the knowledge base.

In various embodiments, all content in the knowledge base or used to generate content in the knowledge base is associated with a particular enterprise, providing an enterprise-specific corpus for training one or more trained models and for generating output from the one or more trained models. Having an enterprise-specific information allows the trained models and the knowledge base to reflect token usage and syntax tailored to the particular enterprise. This allows the trained models to account for enterprise-specific characteristics or preferences when generating output tokens from input tokens.

In some embodiments such as in a development environment, the knowledge base includes source code files (or content generated from such source code files) that include code for execution by one or more processors. In some embodiments, the knowledge base includes documentation describing one or more of the source code files (or content generated at least in part based on such documentation), files describing issues tracked with one or more source code files (or content generated at least in part based on files describing issues tracked with one or more source code files), files describing revision histories to one or more source code files (or content generated at least in part based on files describing revision histories to one or more source code files), or other information. Inclusion of such content in the knowledge base allows the trained models to account for more contextual information to supplement received input tokens. This allows the output tokens from the trained models to better account for the environment in which the trained models are executed by increasing an amount of information about the environment that is described by the content of the knowledge base.

Readers will appreciate that generative AI systems described here may make use of neural networks (e.g., Recurrent Neural Networks ('RNNs'), Generative Adversarial Networks ('GANs'), and so on). Generative AI systems may leverage models that have been trained on large datasets of existing content to understand patterns, styles, and structures. For instance, a text-based generative AI model may be trained on a corpus of books, articles, or other written/digital content to generate coherent and contextually relevant text. Likewise, a generative AI model that is designed to generate computer program code may be trained on public codebases, private codebases, or combinations thereof.

In embodiments where generative AI (in the form of one or more models, one or more services, one or more software modules, or any combination thereof) is used to generate computer program code, models may be trained on a knowledge base that can include, for example, an organization's existing codebase. In some embodiments, however, when the generative AI is being tasked with generating code, the model may not be able to access the entire knowledge base due to the size of the knowledge base and limitations around how much information can be passed to the model at inference time. For example, while the model may leverage the entire codebase at training time, the amount of additional information that can be passed to the model at inference time may be limited, which can present issues especially where the knowledge base is dynamic (e.g., like the dynamic codebase of an organization).

Readers will appreciate that in some embodiments where generative AI systems are used to generate computer program code, models may be trained on a codebase (including the codebase of a particular business, a particular business unit, a particular developer or group of developers, and so on). While such a codebase may change, such change may occur over a non-trivial amount of time such that while the codebase is not static, the codebase does change slowly. For example, a particular business organization is unlikely to rewrite their entire codebases daily. As such, in some embodiments, caching and offline processing of a particular codebase may be leveraged. In these embodiments, various computations may be performed offline.

Consider an example in which a user of the generative AI systems is writing some code segment (e.g., a function) and the generative AI system is tasked with recommending some code snippet that can be inserted into the code that is being developed (i.e., the generative AI system is task with performing an auto-completion function for some code that is being written). In this example, computations that are related to identifying characteristics of code that is contained in the codebase may be done offline and the results of those computations may be cached (at least partially), so that the results of those computations can be leveraged when suggesting code to insert-without needing to inspect the entire codebase constantly as the user develops code.

In a similar manner, other computations (e.g., those that are associated with detecting the intent of a user that is developing code, those computations that are otherwise associated with analyzing a codebase) may be performed offline and cached. In this example, the term 'offline' can include at times other than when the generative AI system is attempting to generate output. For example, the computations could occur at some time other than when the generative AI system is evaluating code that is being developed by a user and recommending code that could be inserted into the user's code.

Through the usage of offline processing and caching, the systems described here can pre-compute things, partially cache them, and even perform relatively cheap updates on the fly to have very powerful models that are fast and current. For example, any kind of latent representation that reflect an understanding of the codebase can be precomputed and cached to understand what different pieces of the codebase can do, to generate summaries of the codebase, analysis of the codebase, chains of thought related to the codebase, and so on. Reader will appreciate that because neural networks transform discrete input (e.g., tokens) into embeddings, the cache could be structured so that what we cache is an intermediate latent representation (i.e., some simplified version of input) rather than something that would be sent to a user of the system such as a software developer, where that intermediate latent representation could be used for a variety of purposes later on.

In some embodiments, generative AI systems may be enhanced through retrieval augmentation that allows for efficient retrieval and filtering of relevant pieces of code that may ultimately be presented to a user for inclusion in some code that the user is developing, or otherwise included in some code that is being generated. In some embodiments, separate models may be trained to do the retrieval. These models may be used, for example, to look at a piece of code (i.e., code that is being written by a developer), compare it to some other code/search the knowledge base for the most relevant piece of code, and then present that relevant piece of code to the developer. To train these retrieval models, the models may need to be provided with many examples of code that is related so as to enable the model to identify related code. To generate a signal that relates two pieces of code, some embodiments may examine existing code repositories and look at each change that is made in the code repository and identify situations in which changing a first piece of code was followed by a second piece of code being changed, as this may be indicative of the first piece of code and the second piece of code being related. This may be especially true in some situations such as, for example, when the same user changed each piece of code in a relatively short period of time. In these embodiments, commit histories from a code management system may be examined to identify the activity described above, or other data sources may be examined to identify activity that may be taken as a signal that some pieces of code are related. In other embodiments, other information may be indicative that some pieces of code are related. For example, if two pieces of code are described in the same document (e.g., a design document), this may be an indication that the two pieces of code are related. Readers will appreciate that such signals (and other signals) may be fairly specific to code rather than language generally, so these signals may be more useful when training retrieval models that are part of a generative AI system that generates computer program code.

Readers will appreciate that in some forms of generative AI (e.g., autoregressive language models), a user may be editing a document with their cursor in a particular location. In these embodiments, the generative AI application may know what came before the cursor and may be attempting to determine what comes next. With code, however, the user of generative AI system that generates code may be editing some code segment with their cursor in a particular location of the code that they are developing. The generative AI system that generates code may benefit from knowing not only what came before the cursor, but the generative AI system may also benefit from understanding what comes at some point after the cursor—as the generative AI is attempting to determine what comes in the middle of those two code portions. As such, embodiments of the present disclosure may be configured to analyze code, come up with examples of code that is aligned with what a user would want to do, and training models on that dataset. Such a process may, in some embodiments, involve statically analyzing existing code (i.e., code from a user's codebase) to pick out some fill-in-the-middle ('FIM') examples. For example, the models may be trained with examples of what is typically written between a set of parentheses, examples of what is typically written inside a loop, examples of what is typically written to complete a function, and so on.

In some embodiments, the generative AI systems described here may leverage a set of static code analysis heuristics that work well and can be used to create a dataset that is useful for training models uses by generative AI systems that can do FIM for computer program code. In these embodiments, models are trained and training sets are generated to cover sampling at multiple levels of hierarchy (parenthesis, functions, class, etc. . . . ). The training sets are also created with a distribution that is similar to a distribution that would be similar to a user's knowledge base (i.e., their code repository) so that models behave in accordance with the appropriate distribution.

Readers will appreciate that the fact that code is structured may be particularly useful in FIM applications. In particular, because code has a lot of structure, the systems described herein may be leverage that structure to identify semantically meaningful expressions, figure out where they begin and end, and accuracy of the models may be improved by leveraging the knowledge of such structure.

In some embodiments, transformer models that are used by the disclosed generative AI systems may use Multilayer Perceptron ('MLP'), Transformers with cross attention, or other components. These components can frequently use large amounts of computing resources. At inference time, one vector that represents a token that is being processed is passed through a leaf matrix and a tensor is output, which is subsequently passed through another matrix. Embodiments described herein may sort the entrance of this matrix so that similar rows are close to each other and placed into buckets. Readers will appreciate that after an activation function, all negative values are zeroed out and there are frequently only very few positive values (1-5%). In some embodiments, the relatively small number of buckets that produce positive values can be identified and only those buckets may be used in subsequent computations. Furthermore, estimations may be made regarding which buckets will produce positive values, thereby drastically reducing the amount of the amount of compute necessary. An example is depicted in the figures.

In some embodiments, retrieval can be enhanced using static analysis of code as described above. Readers will appreciate that some embodiments go beyond this straightforward usage of static analysis. For example, in some embodiments static analysis will be combined with fine tuning of code models. Readers will appreciate that retrieval can be leveraged to show things to a model, but if the model wasn't specifically trained to use that kind of information, results may be less than ideal. To improve results, in some embodiments models that are part of the generative AI systems described here may be trained on the type of information that retrieval models can retrieve (e.g., while some embodiments can do static analysis and pull up some functions definitions, other embodiments may involve the additional step of training the model to use those function definitions). In addition, a dense retriever may be trained to imitate that behavior (i.e., using static analysis to retrieve), but it is just one signal that is leveraged by the model. This embodiment may be more flexible than doing static analysis-based retrieval because a neural retrieval model has the ability to weigh how important it is to generate some function based on static analysis, but the neural model also can use other considerations as signals. The model may therefore combine different signals into a single model (e.g., static analysis+detecting whether two pieces of code are related based on them being described in the same model+ other signals). Essentially the static analysis is just one signal, but the model takes other signals into consideration as well. In embodiments where a dense retriever is trained as described here, at inference time it may not be necessary to do the static analysis in real-time.

Readers will appreciate that one aspect related to generating code that is distinct from generating natural language text is that code can be executed. In fact, in some embodiments code may be executed to provide valuable signals to one or more models that are used by a generative AI system. For example, if the code that was generated by a generative AI system doesn't compile, this is a powerful signal that one or more models that are used by a generative AI system didn't generate valuable out. Such signals may not be present in other generative AI domains (e.g., general text generation).

In some embodiments, code compilation and/or code execution may be used as signals for various models that are used by the generative AI system, including code generation models, retrieval models, and so on. In fact, code compilation and/or code execution may be used in the training of various models, or as input signals when the trained models are being utilized. Code compilation and/or code execution can be used, for example, to identify relationships between code segments (e.g., a code segment can be executed to see what other functions are called as a result of running that code segment). This is one example of a signal that could be generated by code execution. Other examples can include providing a stack trace in model training or as input to a trained model during model execution, providing error messages in model training or execution, and so on. In some embodiments, the execution of code could be periodically stopped to not only check its state but to use that state for model training and execution.

Readers will appreciate that running code models/language models can be a slow process as tokens are generated one at a time. For example, models may receive a question, crunch through it and predict the next word, then the next word, then the next word, and so on, such that this process becomes highly serialized. Embodiments described here may leverage speculative decoding that takes advantage of the fact that many words are easy to predict (e.g., the). In order to leverage speculative decoding, a small, simple model may be used to generate some potential outputs (e.g., in response to a cursor being at some location within a code segment) and then larger, more highly tuned models may be leveraged to sift through the speculatively generated output—keeping the good ones and tossing the bad ones.

In some embodiments, speculative decoding may leverage any small type of 'small' model in the sense that executing the model is not as resource intensive as executing larger, more complicated models. In some embodiments, the small model is a scaled down version of a larger model, but in other embodiments the small model is not a small version of the larger model. For example, the small model may be embodied as a classical model from machine learning (i.e., a model that is not a neural network) that is trained on the requests of a user of the generative AI system. Such a request may include some number (i.e., a few thousand) of tokens: here is what the current file of the user looks like, here is where the cursor is located and where we want to generate code, and so on. In some embodiments, those tokens may be passed to some small model (e.g., an n-gram model or some other non-neural model) to speculatively generate output, where the small model is trained on the requests such as those described above or similar requests.

Readers will appreciate that as described above (and in other ways), some aspects associated with executing a generative AI system may involve serial processing and execution of various components. Readers will appreciate that while parallel processing is more efficient than serial processing, it is not infinitely more efficient. More specifically and as applied to speculative decoding, while there is a limit to how many speculative guesses (i.e., speculative outputs) that can be sent to the GPUs and downstream components to sift through while still being efficient, that limit is reasonably high for modern computing components such as GPUs. In some embodiments, it may therefore be possible to send batches of guesses (i.e., speculative outputs) in parallel (e.g., guess on the 10 next tokens using model 1 and send that as batch 1, guess on the 10 next tokens using model 2 and send that as batch 2, and so on).

In some embodiments, to reap meaningful benefits from speculative decoding, multiple small models may be used for performing speculative decoding in parallel. More specifically, different types of small models may be used for speculative decoding in parallel, as there is value in making diverse guesses (i.e., speculative outputs) rather than making the same guesses multiple times. For example, because an n-gram model trained as described above may generate dramatically different guesses than an n-gram model trained differently, which may generate dramatically different guesses than a small neural model, the embodiments described herein may leverage multiple types of small models doing speculative decoding in parallel. The observation here may be that while each of these small models has some defects, they have different defects.

In some embodiments, the generative AI systems may leverage a user interface that can itself present useful features of the generative AI system or otherwise provide access to useful features of the generative AI system. For example, in some embodiments a UI may be provided to enable a user of the generative AI system to effectively provide pseudocode that relates to some code that the user would like to have the generative AI system create. In this embodiment, a user of the generative AI system can provide a description of what they want the code to generally do. The user may subsequently be presented with a list of options and the user can make a selection (at which point the model is told to turn the selection into real code). Furthermore, in some embodiments other features could be delivered through the UI. For example, the UI may present information to a user of the generative AI system to show the user what sources from their codebase were used to do some code completion/code creation that was output by the generative AI system. In some embodiments, the user could even provide feedback (e.g., indicate whether the source is good source or not) that one or more models in the generative AI system can be trained on.

In some embodiments, an auditing function could be delivered through the UI, where a user of the generative AI system could be presented with information identifying what portions of some code was written by a developer (or edited by a developer) and what part was generated by the generative AI system. In some embodiments, information could even be delivered through the generative AI system indicating which user within their organization wrote some code, what the code generation tool wrote, and discovered issues or other metrics could even be tied back to those specific code portions. For example, tools could be used to tie the introduction of some code update to performance degradation that was discovered, to the introduction of a security vulnerability that was discovered, to a spike in memory utilization that was discovered, and so on. Not only would it be useful to alert a user to this sort of information via the UI, but this information could even be used as a signal that is mapped back to a particular change for training, remediation, and so on.

Readers will appreciate that in some situations users of a generative AI system that generates computer program code may experience problems when autosuggesting or completing code. For example, users may be working on incomplete state of their code where a large amount of code (e.g., a function or class) may need to be completed, but they would prefer to review and accept completions in small amounts (e.g., a single function call, statement, or for loop). In addition, users may have some structure (e.g., closing brackets, quotes) that is auto-inserted by their IDE, which need to be skipped by code generation models during code generation. In some embodiments, pause and skip tokens may be utilized to address the situations described above.

To address the situation where a user would prefer to review and accept completions in small amounts, the code generation models that are included in the generative AI systems described here may be trained to generate a special "pause" token that helps the IDE to show the user a smaller completion. In these embodiments, if the user approves this completion, it can immediately show the next part of the completion and so on. This may be achieved, for example and in some embodiments, by modifying the training algorithms that are used to insert pause tokens at the boundaries between syntactic units (i.e., with the help of a parse tree). The code generation models may then be taught to still generate everything that's missing after the cursor, but doing so in multiple pauses so that we can stop the generation after any pause token and present the user with more manageably-sized suggestions that are syntactically correct.

To address the situation where users may have some structure (e.g., closing brackets, quotes) that is auto-inserted by their IDE and needs to be skipped by code generation models during code generation, the code generation models that are included in the generative AI system may be trained to generate a special "skip" token that indicates to the IDE that a completion can skip over some of the text after the cursor. In some embodiments, such auto-closing behaviors may be simulated during training data generation (again, making use of a parse tree) and the code generation models may be taught to output a skip token whenever it needs to "jump over" the next closing bracket or other skippable characters.

Although some embodiments are described largely in the context of a generative AI system, a server with generative AI capabilities, or in some other way, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

Readers will appreciate that some embodiments are described in which computer program instructions are executed on computer hardware such as, for example, one or more computer processors. Readers will appreciate that in other embodiments, computer program instructions may be executed on virtualized computer hardware (e.g., one or more virtual machines), in one or more containers, in one or more cloud computing instances (e.g., one or more AWS EC2 instances), in one or more serverless compute instances offered such as those offered by a cloud services provider, in one or more event-driven compute services such as those offered by a cloud services provider, or in some other execution environment.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:

performing static analysis on computer program code in a domain-specific codebase, wherein the static analysis generates information describing the computer program code in the domain-specific codebase, wherein the information describing the computer program code in the domain-specific codebase comprises one or more definitions for one or more existing code segments in the domain-specific codebase; and generating, by a generative artificial intelligence (AI) model, a code suggestion based on the domain-specific codebase, wherein generating the code suggestion comprises:

identifying, by the generative AI model, an existing code segment from the one or more existing code segments in the domain-specific codebase for inclusion in the code suggestion; and generating, by the generative AI model, one or more calls to the existing code segment in the code suggestion based on a definition of the existing code segment included in the one or more definitions.

2. The method of claim 1, further comprising:

determining that the existing code segment in the domain-specific codebase may be a candidate for inclusion in the code suggestion.

3. The method of claim 2, wherein multiple existing segments of code in the domain-specific codebase are candidates for inclusion the code suggestion, the method further comprising ranking the multiple existing segments of code in the domain-specific codebase, wherein the code suggestion is based on results from ranking the multiple existing segments of code in the domain-specific codebase.

4. The method of claim 3, wherein ranking the multiple existing segments of code in the domain-specific codebase is performed by a neural ranker.

5. The method of claim 2, further comprising performing property checking of computer program code in the domain-specific codebase, wherein the code suggestion is based on results from performing the property checking.

6. The method of claim 1, further comprising:

identifying, based on results from performing static analysis, duplicated code in the domain-specific codebase; and generating an object to replace the duplicated code.

7. The method of claim 6, wherein the code suggestion includes a reference to the generated object.

8. The method of claim 1, further comprising providing results from performing static analysis to a code generation model during training.

9. A system comprising:

a memory; and a processing device, operatively coupled to the memory, the processing device configured to:

perform static analysis on computer program code in a domain-specific codebase, wherein the static analysis generates information describing the computer program code in the domain-specific codebase, wherein the information describing the computer program code in the domain-specific codebase comprises one or more definitions for one or more existing code segments in the domain-specific codebase;

generate, by a generative artificial intelligence (AI) model, a code suggestion based on the domain-specific codebase, wherein, to generate the code suggestion, the processing device is configured to:

identify, by the generative AI model, an existing code segment from the one or more existing code segments in the domain-specific codebase for inclusion in the code suggestion; and generating, by the generative AI model, one or more calls to the existing code segment in the code suggestion based on a definition of the existing code segment included in the one or more definitions.

10. The system of claim 9 wherein the processing device is further configured to:

determine that the existing code segment in the domain-specific codebase may be a candidate for inclusion in the code suggestion.

11. The system of claim 10, wherein multiple existing segments of code in the domain-specific codebase are candidates for inclusion the code suggestion, wherein the processing device is further configured to rank, by a neural ranker, the multiple existing segments of code in the domain-specific codebase, wherein the code suggestion is based on results from ranking the multiple existing segments of code in the domain-specific codebase.

12. The system of claim 10, wherein the processing device is further configured to perform property checking of computer program code in the domain-specific codebase, wherein the code suggestion is based on results from performing the property checking.

13. The system of claim 9, wherein the processing device is further configured to:

identify, based on results from performing static analysis, duplicated code in the domain-specific codebase; and generate an object to replace the duplicated code, wherein the code suggestion includes a reference to the generated object.

14. The system of claim 9 wherein the processing device is further configured to provide results from performing static analysis to a code generation model during training.

15. A computer program product including a non-transitory computer-readable storage medium storing computer program instructions that, when executed by a processing device, cause the processing device to:

perform static analysis on computer program code in a domain-specific codebase, wherein the static analysis generates information describing the computer program code in the domain-specific codebase, wherein the information describing the computer program code in the domain-specific codebase comprises one or more definitions for one or more existing code segments in the domain-specific codebase;

generate, by a generative artificial intelligence (AI) model, a code suggestion based on the domain-specific codebase, wherein, to generate the code suggestion, the instructions, when executed, cause the processing device to:

identify, by the generative AI model, an existing code segment from the one or more existing code segments in the domain-specific codebase for inclusion in the code suggestion; and generate, by the generative AI model, one or more calls to the existing code segment in the code suggestion based on a definition of the existing code segment included in the one or more definitions.

16. The computer program product of claim 15, wherein the instructions, when executed, further cause the processing device to perform property checking of computer program code in the domain-specific codebase, wherein the code suggestion is based on results from performing the property checking.

17. The computer program product of claim 15, wherein the instructions, when executed, further cause the processing device to:

determine that the existing code segment in the domain-specific codebase may be a candidate for inclusion in the code suggestion.

18. The computer program product of claim 17, wherein multiple existing segments of code in the domain-specific codebase are candidates for inclusion the code suggestion, wherein the instructions, when executed, further cause the processing device to rank the multiple existing segments of code in the domain-specific codebase, wherein the code suggestion is based on results from ranking the multiple existing segments of code in the domain-specific codebase.

19. The computer program product of claim 18, wherein ranking the multiple existing segments of code in the domain-specific codebase is performed by a neural ranker.

20. The computer program product of claim 15, wherein the instructions, when executed, further cause the processing device to:

identify, based on results from performing static analysis, duplicated code in the domain-specific codebase; and generate an object to replace the duplicated code, wherein the code suggestion includes a reference to the generated object.

* * * * *